United States Patent
Kunimoto

(10) Patent No.: US 9,303,765 B2
(45) Date of Patent: Apr. 5, 2016

(54) COMBINED OIL CONTROL RING

(71) Applicant: Kabushiki Kaisha Riken, Tokyo (JP)

(72) Inventor: Akira Kunimoto, Kumagaya (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 164 days.

(21) Appl. No.: 14/257,166

(22) Filed: Apr. 21, 2014

(65) Prior Publication Data

US 2015/0184747 A1    Jul. 2, 2015

(30) Foreign Application Priority Data

Dec. 26, 2013   (JP) .................. 2013-268531

(51) Int. Cl.
| *F16J 9/06* | (2006.01) |
| *F16J 9/12* | (2006.01) |
| *F16J 9/26* | (2006.01) |
| *F16J 9/20* | (2006.01) |

(52) U.S. Cl.
CPC .. *F16J 9/06* (2013.01); *F16J 9/066* (2013.01); *F16J 9/068* (2013.01); *F16J 9/12* (2013.01); *F16J 9/26* (2013.01); *F16J 9/203* (2013.01)

(58) Field of Classification Search
CPC .............. F16J 9/06; F16J 9/065; F16J 9/066; F16J 9/067; F16J 9/068; F16J 9/12; F16J 9/203; F16J 9/26
See application file for complete search history.

(56) References Cited

U.S. PATENT DOCUMENTS

| 5,161,805 | A | 11/1992 | Watanabe et al. | |
| 5,195,758 | A * | 3/1993 | Erway ...................... | F16J 9/068 267/1.5 |
| 5,718,437 | A * | 2/1998 | Tanaka ...................... | F16J 9/066 277/443 |
| 7,044,472 | B2 * | 5/2006 | Takahashi ................ | F16J 9/067 277/434 |
| 2003/0090066 | A1 * | 5/2003 | Takahashi ................ | F16J 9/067 277/434 |
| 2006/0061043 | A1 | 3/2006 | Takahashi et al. | |
| 2012/0235359 | A1 | 9/2012 | Gao et al. | |

FOREIGN PATENT DOCUMENTS

| JP | 56-66429 A | 6/1981 |
| JP | 60-18663 A | 1/1985 |
| JP | 1-78768 U | 5/1989 |

(Continued)

OTHER PUBLICATIONS

European Search Report issued Mar. 19, 2015, in European Patent Application No. 14165721.3.

*Primary Examiner* — Kristina Fulton
*Assistant Examiner* — Nicholas L Foster
(74) *Attorney, Agent, or Firm* — Birch, Stewart, Kolasch & Birch, LLP

(57) ABSTRACT

A combined oil control ring comprising a pair of circular side rails each having a gap, and a spacer expander longitudinally sandwiched by the side rails, which has seating tabs for pushing inner surfaces of the side rails on the inner side, a side rail-pushing surface of each seating tab being provided with one or more grooves extending substantially longitudinally; each of the side rail-pushing surfaces including the grooves being provided with a nitride layer, and the depth d (μm) of the grooves, the surface hardness h (micro-Vickers hardness HV0.1) of the nitride layer, and the thickness t (μm) of the nitride layer having micro-Vickers hardness HV0.1 of 700 or more meeting the relation of the $$0.05 \leq 1000 \times d/(h \times t) \leq 0.45 \qquad (1).$$

6 Claims, 3 Drawing Sheets

(56) References Cited

FOREIGN PATENT DOCUMENTS

| | | |
|---|---|---|
| JP | 3-193221 A | 8/1991 |
| JP | 2000-27995 A | 1/2000 |
| JP | 2001-132840 A | 5/2001 |
| JP | 2006-292021 A | 10/2006 |
| JP | 2006-300224 A | 11/2006 |
| JP | 2013-87816 A | 5/2013 |
| WO | WO 2005/040645 A1 | 5/2005 |
| WO | WO 2011/043364 A1 | 4/2011 |

\* cited by examiner

COMBINED OIL CONTROL RING

FIELD OF THE INVENTION

The present invention relates to a combined oil control ring comprising a pair of circular side rails and a spacer expander, which has excellent wear resistance and sludge resistance while preventing the separate rotation of side rails.

BACKGROUND OF THE INVENTION

To prevent global warming, the reduction of $CO_2$ emission has recently been required, so that improvements in fuel efficiency and combustion efficiency in automobile engines have been pursued. However, improvement in combustion efficiency by elevating the combustion temperature or by direct injection of a fuel into the combustion chamber of an engine leads to the degradation of an engine-lubricating oil, so that the resultant oil sludge makes side rails stick to a spacer expander, wearing seating tabs of the spacer expander.

To prevent the sticking of a spacer expander to side rails with oil sludge, for example, JP 2000-27995 A proposes the formation of a fluorine-containing, oil-repellent coating on a surface of the oil ring, the coating being formed by a sol-gel method from a metal alkoxide and fluoroalkyl-substituted metal alkoxide, in which part of alkoxyl groups are substituted by fluoroalkyl groups. Also, to prevent the seating tabs of a spacer expander from being worn, JP 56-66429 A proposes the soft-nitriding treatment of seating tabs of a spacer expander, and WO 2005/040645 A proposes that a gas-nitrided layer containing an S phase having peaks at $2\theta$ of $40°$ and $46°$ in X-ray diffraction with Cu—K$\alpha$ is formed on seating tabs.

However, the formation of a nitride layer on seating tabs of a spacer expander makes two upper and lower side rails easily rotatable in a circumferential direction separately. If gaps of the upper and lower side rails overlapped, a lubricating oil remaining in the gaps would be conveyed into combustion chambers of an engine, resulting in excessive supply of the lubricating oil and increased oil consumption.

As measures for preventing the separate rotation of side rails, surface roughening for increasing a friction coefficient, and the formation of projections on the side rail-pushing surfaces of seating tabs of a spacer expander to increase a pushing force per a unit area, thereby increasing friction resistance, has been proposed. For example, Japanese Utility Model Application Publication 1-78768 A proposes the formation of fine projections and recesses, for example, saw-like projections and recesses having a pitch of 25-250 µm and height of 15-180 µm, on seating tab surfaces, to increase friction resistance to prevent the rotation of side rails. JP 2001-132840 A proposes the formation of projections as thick as 0.07-0.2 mm in center portions of seating tabs to reduce a contact area, thereby increasing the contact surface pressure of the seating tabs to prevent the rotation of side rails. Further, JP 2013-87816 A proposes the formation of longitudinal projections and recesses having a substantially trapezoidal waveform cross section, on the side rail-pushing surfaces of seating tabs of a spacer expander, taking into consideration fretting fatigue due to the swinging of a piston.

However, when a nitride layer is formed on the seating tabs of a spacer expander, the above measures for preventing the separate rotation of side rails may not work well. It has not been found yet what is necessary for surely preventing the separate rotation of side rails.

OBJECT OF THE INVENTION

Accordingly, an object of the present invention is to provide a combined oil control ring having excellent wear resistance and sludge resistance while preventing the separate rotation of side rails.

DISCLOSURE OF THE INVENTION

As a result of intensive research on the separate rotation of side rails when each seating tab of a spacer expander is provided with one or more grooves and a nitride layer, the inventor has paid attention to the fact that the formation of deep grooves and a thick nitride layer on the seating tabs to reduce the wear of the seating tabs makes it likely for the side rails to rotate separately from the spacer expander, finding that when the depth of grooves and the characteristics of the nitride layer on the seating tabs meet a predetermined condition, an excellent function of preventing the separate rotation of side rails is obtained. The present invention has been completed based on such finding.

Thus, the combined oil control ring of the present invention comprises a pair of circular side rails each having a gap, and a spacer expander longitudinally sandwiched by the side rails, which has seating tabs for pushing inner surfaces of the side rails on the inner side;

a side rail-pushing surface of each seating tab being provided with one or more grooves extending substantially longitudinally;

each of the side rail-pushing surfaces including the grooves being provided with a nitride layer; and the depth d (µm) of the grooves, the surface hardness h (micro-Vickers hardness HV0.1) of the nitride layer, and the thickness t (µm) of the nitride layer having micro-Vickers hardness HV0.1 of 700 or more meeting the relation represented by the following formula (1):

$$0.05 \leq 1000 \times d/(h \times t) \leq 0.45 \qquad (1).$$

The depth d of the grooves is preferably 1-10 µm. The surface hardness h (HV0.1) of the nitride layer is preferably 1000-1500. The thickness t of the nitride layer having micro-Vickers hardness HV0.1 of 700 or more is preferably 5-50 µm.

The entire surface of the spacer expander excluding the side rail-pushing surfaces provided with the nitride layer is preferably covered with a metal coating of Ni or a Ni alloy, and at least one side surface and/or inner surface of the side rail is preferably covered with a metal coating of Ni or a Ni alloy.

BRIEF DESCRIPTION OF THE DRAWINGS

FIG. 5(*b*) is a cross-sectional view showing working rolls forming seating tabs on the spacer expander.

FIG. 5(*c*) is a partial, enlarged view showing a working roll.

DESCRIPTION OF THE PREFERRED EMBODIMENTS

Figure 1:
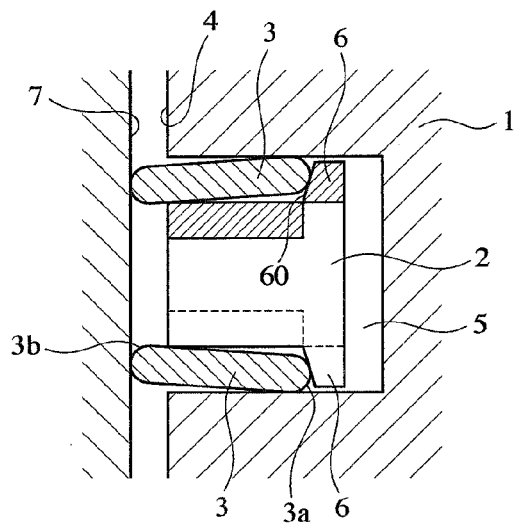
FIG. 1 is a cross-sectional view showing the combined oil control ring of the present invention.

FIG. 1 shows the combined oil control ring of the present invention, which is received in an oil ring groove 5 of a piston 1. The combined control oil ring of the present invention, which may be called simply "combined oil ring," comprises a pair of upper and lower circular side rails 3, 3 each having a gap, and a spacer expander 2 longitudinally supporting the side rails 3, 3. The spacer expander 2 has seating tabs 6 for radially pushing inner surfaces of the side rails 3, 3 on the inner side. Because each seating tab 6 has an inclined side rail-pushing surface 60, the side rails 3, 3 pushed by the side rail-pushing surfaces 60 are pressed onto a cylinder inner wall 7 and upper and lower side surfaces of the oil ring groove 5 for sealing.

Figure 2:
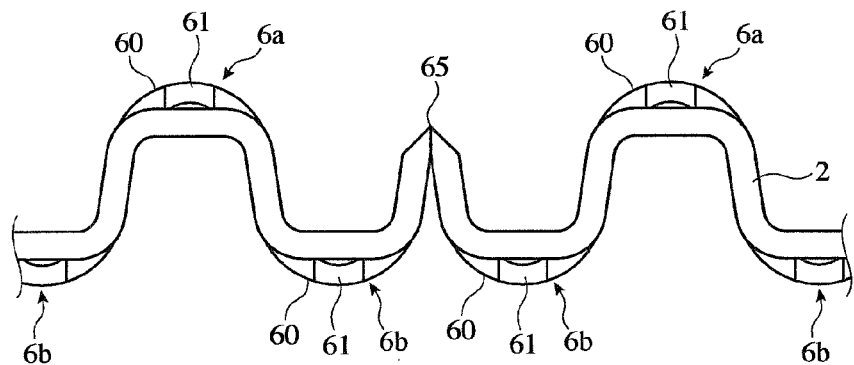
FIG. 2 is a partial side view showing an example of spacer expanders used in the combined oil control ring of the present invention.
Figure 3:
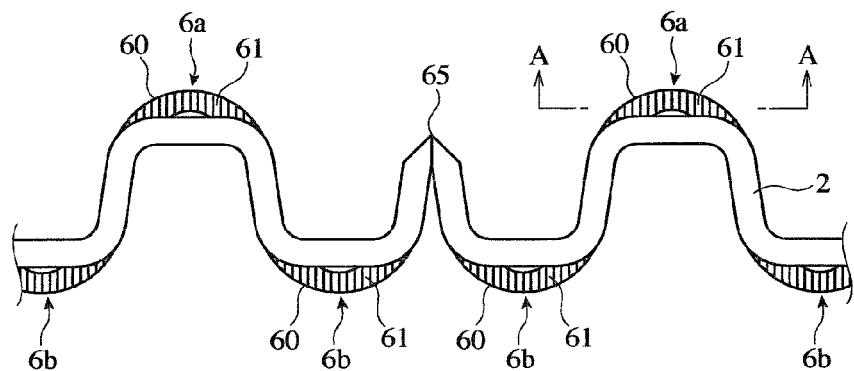
FIG. 3 is a partial side view showing another example of spacer expanders used in the combined oil control ring of the present invention.

As shown in FIGS. 2 and 3, the longitudinally waved spacer expander 2 has upper seating tabs 6a for pushing an upper side rail 3 and lower seating tabs 6b for pushing a lower side rails 3. Each seating tab 6a, 6b is provided with a groove 61 (FIG. 2) or pluralities of grooves 61 (FIG. 3), both as deep as d (μm), which extend substantially longitudinally. Either one or pluralities of grooves provide the same effects. When one groove 61 is formed as shown in FIG. 2, a pair of side end portions on both sides of the groove 61 on the side rail-pushing surface 60, which are only projections 63, act to provide a reduced contact area with the side rails 3, 3 for increasing contact surface pressure, thereby effectively preventing the separate rotation of side rails 3, 3, like pluralities of grooves 61 as shown in FIG. 3.

Figure 4:
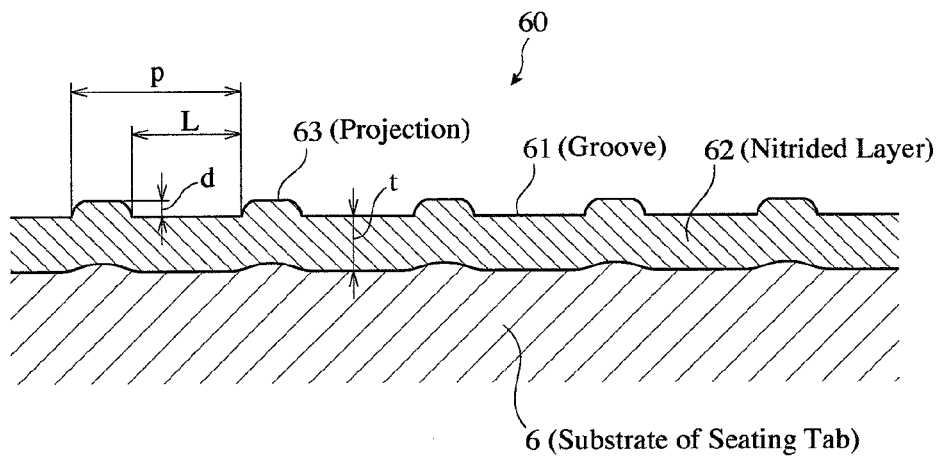
FIG. 4 is a cross-sectional view taken along the line A-A in FIG. 3.

In the example shown in FIG. 4, the side rail-pushing surface 60 has pluralities of grooves 61 and pluralities of projections 63. Though the projections 63 are substantially trapezoidal in this example, the shapes of the grooves 61 and the projections 63 are not restricted in the present invention.

The side rail-pushing surface 60 is provided with a nitride layer 62 to improve its wear resistance. The depth d (μm) of grooves 61 on the side rail-pushing surface 60, the surface hardness (micro-Vickers hardness HV0.1) h of the nitride layer 62, and the thickness t (μm) of the nitride layer 62 having micro-Vickers hardness HV0.1 of 700 or more meet the relation represented by the following formula (1):

$$0.05 \leq 1000 \times d/(h \times t) \leq 0.45 \quad (1).$$

When a contact surface parameter [1000×d/(h×t)] in the above formula (1) is less than 0.05 or more than 0.45, the separate rotation of side rails 3, 3 easily occurs. Namely, when the depth d of grooves in the seating tab 6 is too small relative to the thickness t of the nitride layer 62 (when the nitride layer 62 is too thick), the contact area is not sufficiently reduced due to the existence of a lubricating oil, and the seating tab 6 has too high surface rigidity, easily suffering the separate rotation of side rails 3, 3. When the depth d of grooves in the seating tab 6 is close to the thickness t of the nitride layer 62 (when the thickness t of the nitride layer 62 is relatively small), the seating tab 6 has low surface rigidity, so that the projections 63 are easily broken and worn despite good contact with the side rails 3, 3. As a result, the contact area increases, resulting in reduced surface pressure, so that the separate rotation of side rails 3, 3 easily occurs. As described above, because the thickness t and hardness h of the nitride layer 62 have similar effects, they are in a denominator in the formula of the contact surface parameter. In the present invention, the contact surface parameter is preferably 0.05-0.40, more preferably 0.05-0.35.

The depth d of grooves in the seating tabs 6 of the spacer expander 2 is preferably 1-10 μm, more preferably 2-8 μm, most preferably 3-7 μm. The surface hardness h (micro-Vickers hardness HV0.1) of the nitride layer 62 is preferably 1000-1500, more preferably 1100-1450, most preferably 1150-1400. The thickness t of the nitride layer 62 having hardness of 700 or more is preferably 5-50 μm, more preferably 10-40 μm, most preferably 15-35 μm.

Figure 5A:
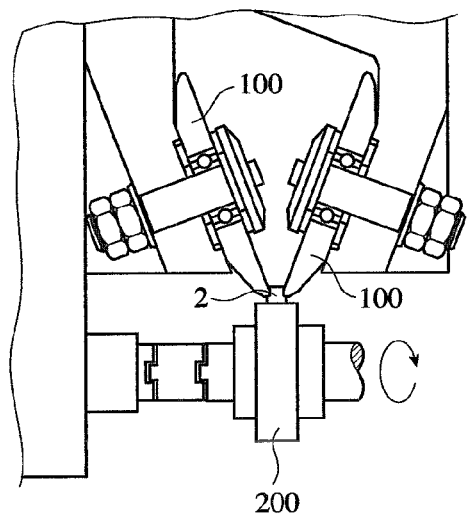
FIG. 5(*a*) is a front view showing an apparatus for forming seating tabs on the spacer expander.
Figure 5B:
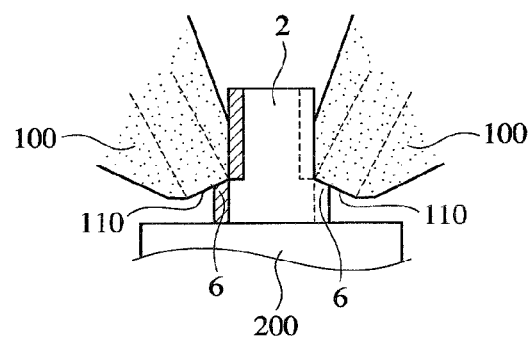
Figure 5C:
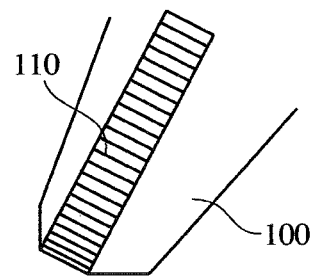

The seating tabs 6 of the spacer expander 2 can be formed by the rolling method described in JP 3-193221 A, which is shown in FIG. 5. Working rolls 100, 100 having desired projections and recesses are pressed to the side rail-pushing surfaces 60 of the seating tabs 6, so that projections and recesses on a working surface (110) of each working roll 100 are transferred to the side rail-pushing surfaces 60 of the seating tabs 6. Because the shape of each seating tab 6 is an inversed shape of the working roll 100, the pitch p and circumferential length L of grooves are determined by the shape of the working roll 100, and the depth d of grooves is determined by the pressing depth of the working roll 100.

Though the formation of a nitride layer on the side rail-pushing surfaces of the spacer expander is required in the present invention, the nitride layer may be formed on the entire surface of the spacer expander. The nitride layer is preferably formed by a gas-nitriding method, but it may of course be formed by a salt bath nitriding method or a plasma nitriding method, particularly not restrictive. When the nitride layer is formed on the entire surface of the spacer expander, the tension varies largely by nitriding, likely making it difficult to control the tension tolerance of a low-tension combined oil ring.

When the nitride layer is formed only on the side rail-pushing surfaces of the seating tabs, JP 2006-292021 A discloses a method for producing a spacer expander comprising plating a wire for the spacer expander with Ni, heat-treating the Ni-plated wire to lower the hardness of the Ni coating, plastically working the wire to form a spacer expander, forming seating tabs by local shearing such that a wire substrate is exposed only on a side rail-pushing surface of each seating tab, and subjecting the exposed substrate to a nitriding treatment to reduce the unevenness of tension. In the present invention, too, the technology of JP 2006-292021 A is preferably utilized to form a nitride layer on the side rail-pushing surfaces of the seating tabs of the spacer expander, with the Ni plating remaining on the entire surface of the spacer expander except for the side rail-pushing surfaces having the nitride layer.

The thickness of the plating layer of Ni or a Ni alloy is preferably 1-9 μm, more preferably 2-8 μm, most preferably 3-7 μm or more. To avoid such defects as breakage, bloating, cracking, peeling, etc. when forming seating tabs in the spacer expander with gears, the plating layer should have sufficient ductility and adhesion. Therefore, a Ni-diffused layer of preferably 10 nm or more, more preferably 50 nm or more, is formed in the substrate under the interface.

As measures against oil sludge, WO 2011/043364 discloses the formation of a metal coating (for example, Ni, Cu, or Ni—Cu alloy) having a surface free energy of 40 mJ/m$^2$ or less at 60° C. and a hydrogen bonding force of 10 mJ/m$^2$ or less on at least part of the oil ring surface, to drastically reduce the adhesion of oil sludge. In the present invention, too, the technology of WO 2011/043364 is preferably utilized to form a metal coating of Ni or a Ni alloy on at least one side surface of each side rail. The formation of a metal coating of Ni or a Ni alloy on the inner surfaces 3a of the side rails 3 coming into contact with the seating tabs 6 of the spacer expander 2 further contributes to avoiding the separate rotation of side rails by contact of high-hardness seating tabs 6 with the inner surfaces 3a of the low-hardness side rails 3.

The present invention will be explained in more detail referring to Examples below without intention of restricting the present invention thereto.

Example 1

(1) Production of Combined Oil Rings

To obtain a combined oil ring having a nominal diameter of 75 mm, a combined nominal width of 2.0 mm and a combined thickness of 2.5 mm, a rolled strip (SUS304) of 2.2 mm×0.275 mm in cross section was provided with a Ni plating of about 6 μm in thickness, heat-treated at 500° C. for 1 hour, and then formed into spacer expanders by local bending and shearing with gears. Grooves (pitch P: 0.18 mm, width L: 0.11 mm, and depth d: 0.006 mm) shown in FIG. 4 were formed by rolling in the seating tabs each having a circumferential length of 1.28 mm.

The above spacer expanders were subjected to a gas-nitriding treatment at 570° C. for 80 minutes, and a nitride layer was formed on the seating tabs, on which the strip substrate was exposed by shearing by forming with gears. Because the Ni plating layer acting as a nitriding-preventing layer remained on the entire surface of the spacer expander excluding the side rail-pushing surfaces on which the nitride layer was formed, low-tension spacer expanders meeting the predetermined tolerance requirement were obtained, with increase in their development length by nitriding suppressed. The nitride layer had surface hardness h (micro-Vickers hardness HV0.1) of 1290, and the thickness t of the nitride layer having micro-Vickers hardness HV0.1 of 700 or more was 31 μm.

The analysis of the depth-direction distribution of element concentrations in the Ni plating on the spacer expander by glow discharge-optical emission spectroscopy revealed that a Ni-diffused layer as deep as about 70 nm was formed in the substrate under the Ni plating layer.

Side rails were formed from a rolled strip (SUS440) of 2.0 mm×0.35 mm in cross section by coiling. A CrN coating as thick as 26 μm was formed on outer surfaces 3b of the side rails 3 by ion plating.

(2) Evaluation of the Separate Rotation of Side Rails

Figure 6:
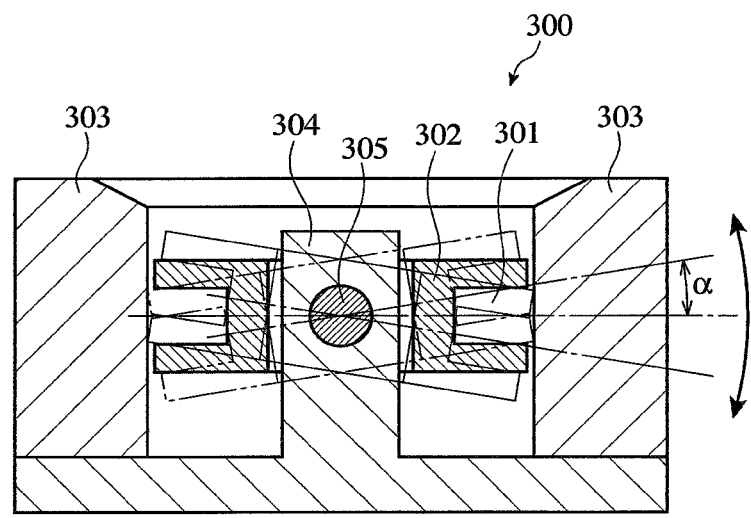
FIG. 6 is a schematic cross-sectional view showing an apparatus for evaluating the separate rotation of side rails.

In the evaluation apparatus 300 shown in FIG. 6, the combined oil ring of Example 1 comprising two upper and lower side rails 3, 3 and a spacer expander 2 assembled such that the gaps of the side rails 3, 3 were separate from the joint 65 of the spacer expander 2 by 30° in opposite circumferential directions was mounted in a pseudo-oil ring groove 301 of a holder (pseudo-piston) 302, and swung at a speed of 10 reciprocations per second for 10 minutes at each swing angle α changing from 0.5° to 7.5° by every 0.5°, around a fulcrum 305 in a support 304 of a cylinder (pseudo-cylinder) 303. A swing angle at which the separate rotation of side rails occurred was observed to evaluate the capability of preventing the separate rotation of side rails. A larger swing angle, at which the rotation of side rails starts, means that the combined oil ring has a structure more resistance to the rotation of side rails. In the combined oil control ring of Example 1, the separate rotation of side rails did not occur even at a swing angle α of 7.5°. Accordingly, the rotation start angle of side rails was evaluated as >7.5°.

(3) Evaluation of Oil Consumption

The combined oil rings of Example 1 were assembled in a four-cylinder gasoline engine having a displacement of 1500 $cm^3$, and the engine was operated under a wide-open throttle (WOT) condition at 5,000 rpm for 48 hours to measure the wear of each side rail-pushing surface 60 and each side rail inner surface 3a opposing each other, and oil consumption. Top rings each having a peripheral barrel face and second rings each having a peripheral tapered face were assembled in this engine in advance. The total wear of each side rail-pushing surface 60 and each side rail inner surface 3a opposing each other was 1 μm or less, and the oil consumption was 9 g/hr.

Examples 2-28, and Comparative Examples 1-17

About 500 spacer expanders with grooves having the depths d of 2 μm, 3 μm, 6 μm, 9 μm, 13 μm and 22 μm, respectively, formed in the seating tabs were produced. The seating tabs of the spacer expanders had the same circumferential length, pitch and groove width as in Example 1. Each spacer expander was subjected to a nitriding treatment under the conditions (temperature and time) shown in Table 1. With respect to each spacer expander, the surface hardness h of the nitride layer, and the thickness t of the nitride layer having micro-Vickers hardness HV0.1 of 700 or more were measured. In each of Examples 2-28 and Comparative Examples 1-17, each spacer expander was combined with the side rails used in Example 1 to conduct the same evaluation test of the separate rotation of side rails as in Example 1. The results are shown in Table 1 together with those of Example 1.

TABLE 1

| | Spacer Expander | | | | | | |
|---|---|---|---|---|---|---|---|
| | | Nitride Layer | | | | | |
| No. | $d^{(1)}$ (μm) | Nitriding Temp. (° C.) | Nitriding Time (minute) | $h^{(2)}$ (HV0.1) | $t^{(3)}$ (μm) | $Cp^{(4)}$ | $As^{(5)}$ (°) |
| Example 1 | 6 | 570 | 60 | 1290 | 31 | 0.150 | >7.5 |
| Example 2 | 2 | 550 | 5 | 1365 | 8 | 0.183 | >7.5 |
| Example 3 | 2 | 550 | 40 | 1364 | 18 | 0.081 | >7.5 |
| Com. Ex. 1 | 2 | 550 | 80 | 1354 | 34 | 0.043 | 5 |
| Com. Ex. 2 | 2 | 550 | 150 | 1348 | 49 | 0.030 | 4 |
| Com. Ex. 3 | 2 | 550 | 220 | 1350 | 56 | 0.026 | 3.5 |
| Example 4 | 3 | 590 | 5 | 1255 | 12 | 0.199 | >7.5 |
| Example 5 | 3 | 590 | 60 | 1248 | 31 | 0.078 | >7.5 |
| Example 6 | 3 | 590 | 80 | 1262 | 47 | 0.051 | >7.5 |
| Com. Ex. 4 | 3 | 590 | 150 | 1259 | 52 | 0.046 | 4 |
| Com. Ex. 5 | 3 | 590 | 220 | 1263 | 58 | 0.041 | 4.5 |
| Com. Ex. 6 | 6 | 570 | 5 | 1308 | 8 | 0.573 | 3.5 |
| Example 7 | 6 | 570 | 10 | 1297 | 16 | 0.289 | >7.5 |
| Example 8 | 6 | 570 | 40 | 1312 | 21 | 0.218 | >7.5 |
| Example 9 | 6 | 570 | 60 | 1320 | 36 | 0.126 | >7.5 |
| Example 10 | 6 | 570 | 80 | 1310 | 43 | 0.107 | >7.5 |
| Example 11 | 6 | 570 | 150 | 1305 | 48 | 0.096 | >7.5 |
| Example 12 | 6 | 570 | 220 | 1326 | 54 | 0.084 | >7.5 |
| Com. Ex. 7 | 6 | 590 | 5 | 1180 | 9 | 0.565 | 4.5 |
| Example 13 | 6 | 590 | 10 | 1204 | 18 | 0.277 | >7.5 |
| Example 14 | 6 | 590 | 40 | 1220 | 30 | 0.164 | >7.5 |
| Example 15 | 6 | 590 | 60 | 1196 | 41 | 0.122 | >7.5 |
| Example 16 | 6 | 590 | 80 | 1178 | 49 | 0.104 | >7.5 |
| Example 17 | 6 | 590 | 150 | 1209 | 55 | 0.090 | >7.5 |
| Com. Ex. 8 | 9 | 570 | 5 | 1310 | 7 | 0.981 | 3 |
| Com. Ex. 9 | 9 | 570 | 10 | 1305 | 15 | 0.460 | 3 |
| Example 18 | 9 | 570 | 40 | 1325 | 28 | 0.243 | >7.5 |
| Example 19 | 9 | 570 | 60 | 1320 | 39 | 0.175 | >7.5 |
| Example 20 | 9 | 570 | 150 | 1316 | 47 | 0.146 | >7.5 |
| Example 21 | 9 | 570 | 220 | 1308 | 53 | 0.130 | >7.5 |

TABLE 1-continued

| | Spacer Expander | | | | | | |
|---|---|---|---|---|---|---|---|
| | Nitride Layer | | | | | | |
| No. | d[1] (μm) | Nitriding Temp. (°C.) | Nitriding Time (minute) | h[2] (HV0.1) | t[3] (μm) | Cp[4] | As[5] (°) |
| Com. Ex. 10 | 13 | 550 | 5 | 1340 | 6 | 1.617 | 2.5 |
| Com. Ex. 11 | 13 | 550 | 40 | 1334 | 19 | 0.513 | 3 |
| Example 22 | 13 | 550 | 80 | 1326 | 33 | 0.297 | >7.5 |
| Example 23 | 13 | 550 | 150 | 1330 | 46 | 0.212 | >7.5 |
| Example 24 | 13 | 550 | 220 | 1351 | 56 | 0.172 | >7.5 |
| Com. Ex. 12 | 22 | 550 | 5 | 1344 | 8 | 2.046 | 3 |
| Com. Ex. 13 | 22 | 550 | 40 | 1350 | 16 | 1.019 | 2.5 |
| Com. Ex. 14 | 22 | 550 | 80 | 1353 | 31 | 0.525 | 4.5 |
| Example 25 | 22 | 550 | 150 | 1310 | 45 | 0.373 | 7 |
| Example 26 | 22 | 550 | 220 | 1365 | 52 | 0.310 | >7.5 |
| Com. Ex. 15 | 22 | 580 | 5 | 1280 | 7 | 2.455 | 2 |
| Com. Ex. 16 | 22 | 580 | 10 | 1285 | 15 | 1.141 | 2.5 |
| Com. Ex. 17 | 22 | 580 | 40 | 1276 | 29 | 0.595 | 2.5 |
| Example 27 | 22 | 580 | 60 | 1289 | 41 | 0.416 | 6.5 |
| Example 28 | 22 | 580 | 150 | 1271 | 52 | 0.333 | >7.5 |

Note:
[1]The depth of grooves in the seating tab.
[2]The surface hardness of the nitride layer.
[3]The thickness of the nitride layer having HV0.1 of 700 or more.
[4]Contact surface parameter [1000 × d/(h × t)].
[5]The angle at which the separate rotation of side rails started.

As is clear from Table 1, the rotation start angle As of side rails was 6.5° or more when the contact surface parameter Cp was in a range of 0.05-0.45, 7° or more when Cp was in a range of 0.05-0.40, and 7.5° or more when Cp was in a range of 0.05-0.35. This indicates that by adjusting the depth d of grooves, and the surface hardness h and thickness t of the nitride layer such that the contact surface parameter Cp is in a range of 0.05-0.45, the separate rotation of side rails can be surely prevented.

Each spacer expander of Comparative Example 6 and Example 7 was combined with the side rails used in Example 1 to conduct the engine test under the same conditions as in Example 1. As a result, when the spacer expander of Comparative Example 6 was used, the total wear of the side rail-pushing surface 60 of the seating tab 6 and the inner surface 3a of the side rail 3 was 6 μm, and the oil consumption was 18 g/hr. However, when the spacer expander of Example 7 was used, they were as small as 1 μm or less and 7 g/hr, respectively.

Examples 29-31

Spacer expanders were produced in the same manner as in Example 1, except for forming a groove (width: 0.78 mm) in Example 29, three grooves (pitch P: 0.40 mm, and width: 0.24 mm) in Example 30, and five grooves (pitch P: 0.25 mm, and width: 0.15 mm) in Example 31 in the seating tabs of 1.28 mm in circumferential length. Each spacer expander was combined with the side rails used in Example 1, to conduct the same evaluation test of the separate rotation of side rails as in Example 1. As a result, the rotation start angle of side rails was 7.5° or more in all combined oil rings, exhibiting an excellent function of preventing the separate rotation of side rails regardless of the number of grooves.

Examples 32 and 33, and Comparative Example 18

Combined oil rings (Example 32) each comprising side rails obtained by providing a rolled strip with Ni plating as thick as about 3 μm, and forming CrN as thick as 31 μm by ion plating on the outer surfaces 3b, and the same spacer expander as in Example 1, and the same combined oil rings (Example 33) as in Example 1 except that the spacer expander was provided with Ni plating as thick as about 3 μm, but the side rails had no Ni plating, were assembled in two cylinders of the same four-cylinder gasoline engine as used in the above oil consumption evaluation, and combined oil rings (Comparative Example 18) each comprising a spacer expander nitrided on the entire surface, and side rails having a CrN layer as thick as 31 μm only on the outer surfaces 3b without Ni plating were assembled in the remaining two cylinders of the engine. Incidentally, the combined oil rings of Comparative Example 18 were assembled in the engine in advance.

Using a degraded engine oil which was commercially collected, the engine was operated for a predetermined period of time, under a cyclic condition continuously repeating a cycle of changing the rotation speed between a stop state and the maximum power, and a cycle of changing the temperatures of the engine oil and cooling water between low temperatures and high temperatures. Thereafter, Each combined oil ring was slowly taken out of the piston, and subjected to ultrasonic washing in acetone to measure the amount of sludge accumulated on (strongly attached to) each combined oil ring. The amount of accumulated sludge was determined from the weight difference before and after the test. Assuming that the average amount of sludge accumulated on two combined oil rings in Comparative Example 18 was 100, the amounts (relative values) of accumulated sludge in Examples 32 and 33 were 59 and 72, respectively. It was confirmed from the above results that the amount of accumulated sludge was reduced by Ni plating formed on the spacer expander or the spacer expander and the side rail.

EFFECTS OF THE INVENTION

Because one or more grooves extending substantially longitudinally and having predetermined depth are formed on the side rail-pushing surfaces of the seating tabs of the spacer expander, each side rail-pushing surface in the combined oil ring of the present invention has a small contact area, resulting in high contact surface pressure. In addition, because a nitride layer formed on the side rail-pushing surfaces including the grooves has surface hardness and thickness meeting a particular relation with the depth of the grooves, the combined oil ring of the present invention can surely prevents the separate rotation of side rails.

With a metal coating of Ni or a Ni alloy formed on the entire surface of the spacer expander excluding the seating tabs, a combined oil ring having excellent wear resistance and sludge resistance with little tension unevenness is obtained, contributing to improving fuel efficiency and reducing oil consumption even in severe operation environment with high combustion efficiency. Also, the formation of a metal coating of Ni or a Ni alloy on side surfaces of the side rails contributes to avoiding the sticking of the combined oil ring by oil sludge. Further, the formation of a metal coating of Ni or a Ni alloy on the inner surfaces of the side rails makes it sure to achieve good contact between the inner surfaces of the side rails and the side rail-pushing surfaces of the seating tabs of the spacer expander, contributing to preventing the separate rotation of side rails.

DESCRIPTION OF SYMBOLS

1 Piston
2 Spacer expander

3 Side rail
3a Inner surface of side rail
3b Outer surface of side rail
4 Peripheral surface of piston
5 Oil ring groove
6 Seating tab
6a Upper seating tab
6b Lower seating tab
7 Cylinder inner wall
61 Groove
62 Nitride layer
63 Projection
100 Working roll
110 Working surface
200 Lower roll
300 Apparatus for evaluating the separate rotation of side rails
301 Pseudo-oil ring grooves
302 Holder (pseudo-piston)
303 Cylinder (pseudo-cylinder)
304 Support
305 Fulcrum

What is claimed is:

1. A combined oil control ring comprising:
a pair of circular side rails each having a gap; and
a spacer expander longitudinally sandwiched by said side rails, and having seating tabs for pushing inner surfaces of said side rails on an inner side,
wherein a side rail-pushing surface of each seating tab is provided with one or more grooves extending substantially longitudinally;
wherein each of said side rail-pushing surfaces including said one or more grooves being provided with a nitride layer; and
wherein the grooves each have a depth d in micrometers that is 1-10 μm, the nitride layer on each of said side rail-pushing surfaces including said one or more grooves each have a surface hardness h as measured by a micro-Vickers hardness test HV0.1 that is 700 or more, the nitride layer on each of said side rail-pushing surfaces including said one or more grooves each have a thickness t in micrometers, and wherein the depth d, surface hardness h and thickness t satisfy the relation according to the following formula:

$$0.05 \leq 1000 \times d/(h \times t) \leq 0.45.$$

2. The combined oil control ring according to claim 1, wherein the surface hardness h of said nitride layers as measured by a micro-Vickers hardness HV0.1 is 1000-1500.

3. The combined oil control ring according to claim 1, wherein the thickness t of each nitride layer is 5-500 μm.

4. The combined oil control ring according to claim 1, wherein the entire surface of said spacer expander excluding said side rail-pushing surfaces provided with said nitride layer is covered with a metal coating of Ni or a Ni alloy.

5. The combined oil control ring according to claim 1, wherein at least one side surface of said side rail is covered with a metal coating of Ni or a Ni alloy.

6. The combined oil control ring according to claim 1, wherein the inner surfaces of said side rails are covered with a metal coating of Ni or a Ni alloy.

* * * * *